(No Model.)
C. BLAIR.
FRUIT GATHERER.
No. 595,870. Patented Dec. 21, 1897.
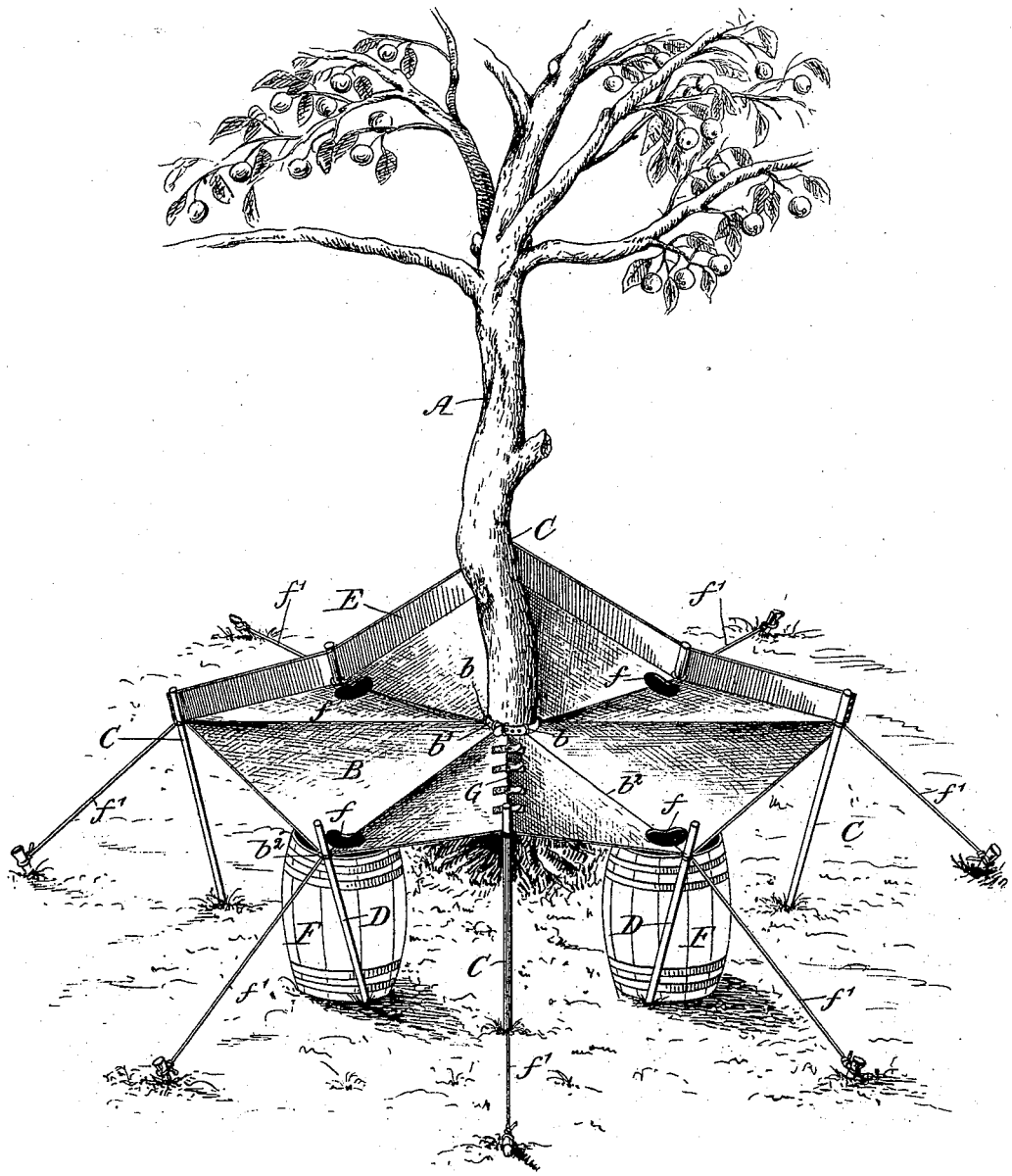
WITNESSES
INVENTOR
Calvin Blair
by John Wedderburn
Attorney

UNITED STATES PATENT OFFICE.

CALVIN BLAIR, OF LEATHERWOOD, PENNSYLVANIA.

FRUIT-GATHERER.

SPECIFICATION forming part of Letters Patent No. 595,870, dated December 21, 1897.

Application filed November 23, 1896. Serial No. 613,193. (No model.)

*To all whom it may concern:*

Be it known that I, CALVIN BLAIR, a citizen of the United States, residing at Leatherwood, in the county of Clarion and State of Pennsylvania, have invented certain new and useful Improvements in Fruit-Gatherers; and I do hereby declare the following to be a full, clear, and exact description of the invention, such as will enable others skilled in the art to which it appertains to make and use the same.

This invention relates to improvements in fruit-gatherers; and it consists of the combination, with a circular sheet of flexible material adapted to be applied about a tree, of a plurality of high poles for supporting the periphery of said sheet at intervals and a plurality of low poles also adapted to support the periphery of said sheet, the construction being such that a plurality of channels are formed in the sheet to guide the fruit caught by the same into suitable receptacles arranged about its periphery.

The figure represents a perspective view of a tree provided with my invention, a portion of the annular surrounding apron being broken away for clearness.

A in the drawing represents the tree; B, the flexible sheet; C, the high stakes; D, the low stakes; E, the surrounding apron, and F F the receiving-receptacles. The said sheet B is preferably constructed of canvas and is cut to form a circular fruit-catching receptacle when applied about the tree A, with its meeting edges secured together by suitable hooks and eyes. The portion of said sheet B that surrounds the tree A is provided with a plurality of rings or eyes $b$, through which a suitable strap $b'$ is passed to secure them firmly to the tree. The said sheet B is also strengthened by a plurality of radiating ropes $b^2$, suitably secured to either its upper or lower surface. Said ropes are adapted to be secured at their outer terminals to the stakes C and D, said stakes being arranged alternately so as to bring first a high and then a low stake. By this peculiar application of the stakes a plurality of radiating channels are formed in the sheet B, so that any fruit falling upon the same from the tree above will be guided into said channels and rolled along the same to apertures $f$ cut near the periphery of the said sheet, which is so arranged as to be slightly lower than the inner portion of the sheet attached to the tree. The apron E is applied about the periphery of the sheet B, so as to prevent the fruit from rolling off of said sheet should it fall upon the same with sufficient force to bound along the inclined portions of said sheet without descending into the discharge-channels.

In practice a suitable opening G may be formed in the sheet B for the accommodation of a ladder, whereby the operator may climb the tree to shake the fruit therefrom into said apron. In order to reach the ladder passing through said opening G, the operator first detaches the outer portion of the meeting edges of the sheet and gradually works his way along said meeting edges, unfastening the hooks and eyes before him and securing the hooks and eyes behind him as he passes forward. After mounting the tree he gently shakes the boughs of the same, whereby the fruit is detached and falls onto the flexible canvas sheet B and is guided by the channels therein into the receiving-receptacles. The said stakes C and D may also be additionally braced, if so desired, by guy-ropes $f'\ f'$, secured to said stakes, and suitable pegs driven into the ground.

Having thus described my invention, what I claim as new, and desire to secure by Letters Patent, is—

1. In a fruit-gatherer, the combination with a flexible sheet adapted to be applied about a tree, of a plurality of high poles and a plurality of low poles arranged alternately about the periphery of said sheet, whereby a plurality of channels are formed in said sheet for the discharge of the fruit that drops upon the same into suitable receptacles arranged about the periphery of said sheet, substantially as described.

2. In a fruit-gatherer, the combination with a flexible sheet adapted to be applied about a tree, of a plurality of supporting-poles of different lengths and arranged alternately about the periphery of said sheet so as to form a plurality of discharge-channels therein, and a protecting-apron arranged about the periphery of said sheet substantially as described.

In testimony whereof I have signed this specification in the presence of two subscribing witnesses.

CALVIN BLAIR.

Witnesses:
JOEL CRAWFORD,
J. T. CRAWFORD.